June 18, 1957  D. J. DONAHUE  2,796,374
METHODS AND MEANS FOR TRANSFERRING PRINTED INDICIA
Filed June 11, 1954
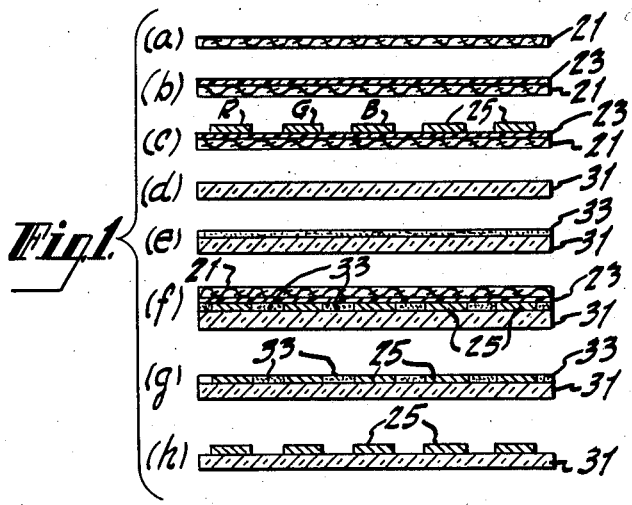
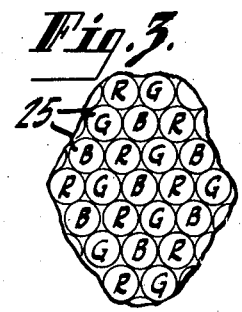
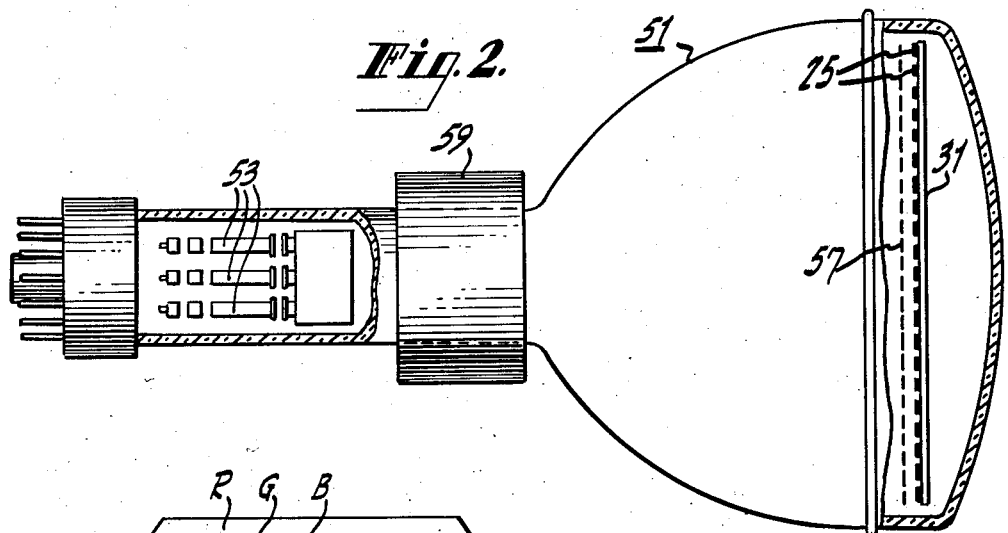
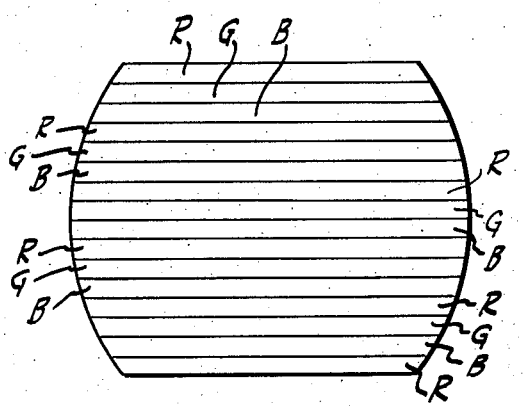
INVENTOR.
DANIEL J. DONAHUE
BY
J. C. Whittaker
ATTORNEY

United States Patent Office 2,796,374
Patented June 18, 1957

2,796,374

METHODS AND MEANS FOR TRANSFERRING PRINTED INDICIA

Daniel J. Donahue, Lancaster, Pa., assignor to Radio Corporation of America, a corporation of Delaware Application June 11, 1954, Serial No. 436,211

12 Claims. (Cl. 154—95)

This invention relates to methods and means for transferring printed indicia by the decalcomania process and specifically, to a decalcomania transfer process producing transferred indicia having a high degree of dimensional fidelity with respect to the original printing plate. The methods and means of the invention are particularly well adapted to the manufacture of tricolor luminescent screens for all-electronic color television kinescopes.

The luminescent screen on the face of an all-electronic, tricolor kinescope comprises an ordered array of small precisely-spaced, precisely-sized phosphor dots arranged in triangular groups of three, or trios, accurately deposited in interlaced positions on a supporting glass surface. Ordinarily, each trio includes one of each of the three primary colors, for example, a red-emitting phosphor dot, a green-emitting phosphor dot, and a blue-emitting phosphor dot. As the cathode ray beam of the kinescope scans the luminescent screen, each excited phosphor dot emits light of a different color in accordance with the intensity of excitation, thereby producing a composite color image to the viewer. The luminescent screens of present tricolor kinescopes comprise about 585,000 phosphor dots or 195,000 dot trios.

The phosphor dots must be very precisely sized and located in order to provide accurate individual excitation of each dot with each frame of the picture. It has been found that the location of the phosphor dots must not vary more than .001 inch on the luminescent screen of a 16″ kinescope.

The phosphor dots comprising the luminescent screen of the kinescope may be applied to the supporting glass surface, or substrate, in several ways. One way is to print the screens directly upon the supporting glass surface by means of a printing press or by a silk screen process. However, the rigid and non-absorbent nature of glass makes these processes difficult in mass production.

An alternative, two-step process for producing luminescent screens may comprise (1) printing of the luminescent screen or other indicia upon a non-rigid, absorbent backing member, such as decalcomania paper, and then (2) transferring this printed screen, or other printed indicia, from the backing member to the supporting glass plate.

A process whereby indicia are printed on a backing member and then are transferred to a substrate is called a decalcomania process. By one type of decalcomania process, the backing member is coated with a thin layer of a release agent such as a gum or a wax. Then, the indicia are printed upon the layer of the release agent. In order to transfer the printed indicia, the surface to receive the indicia is coated with a thin layer of an adhesive. The backing member is positioned on the adhesive layer with the printed indicia imbedded in the adhesive layer. The backing member is then removed. If a gum release agent is used, the assembly is soaked in water, dissolving the gum to release the backing member. If a wax release agent is used, the backing member is merely peeled away.

In order for the transfer of a luminescent screen to be successful, at least three conditions must be satisfied. First, the transferred luminescent screen must not have changed dimensionally in any manner, as by expansion, contraction or other distortion, more than .001 inch for a 16-inch diameter kinescope. Second, all of the materials remaining with the phosphors on the completed transfer must not adversely react therewith and must be volatilized or burned off at temperatures below 450° C. during a subsequent baking step. Third, the phosphor dots must not disintegrate or lift from the face plate of the kinescope during the baking step. The phosphor dots must retain their original printed form and must be sufficiently adherent to the face plate in order to accomplish the further processing steps.

The dimensional requirements for successful decalcomania transfer of luminescent screens are such that conventional transfer methods are inadequate. In order to obtain dimensional stability, at least the following factors must be controlled. (1) The backing member upon which the luminescent screen is printed must be dimensionally stable. Ordinarily decalcomania backing members will change in shape with changes in humidity and temperature. (2) The release agent must be stable. Ordinarily decalcomania release agents include materials which will change in size due to evaporation of a solvent, oxidation of the release agent, or changes in humidity or temperature. (3) The binder used for printing the indicia must be dimensionally stable. (4) The adhesive used to attach the printed indicia to the substrate must be dimensionally stable. Usually, the adhesive used in a decalcomania process includes a solvent which affects the size of the adhesive layer upon evaporation. The solvent from the adhesive also permeates the entire assembly causing a change in dimensions of one or more members of the assembly.

It is an object of this invention to provide improved methods and means for transferring printed indicia.

A further object is to provide methods and means for improving the dimensional fidelity of the printed indicia transferred in a decalcomania process.

Another object is to provide improved methods and means for preparing luminescent screens for kinescopes.

A further object is to provide improved methods and means for transferring printed luminescent screens from a backing member to a kinescope face plate.

Another object is to provide an improved decalcomania process and materials therefor.

The foregoing objects and other advantages may be accomplished in accordance with the present invention which includes a process for preparing a luminescent screen comprising printing luminescent indicia upon a backing member having good dimensional stability, attaching said indicia on said backing member to the surface of a substrate with a thin film of a liquid adhesive mixture comprising a resin that is polymerizable to a solid, such as a polyester and ethoxyline resin, polymerizing said resin film, and removing said backing member from said indicia.

In the use of a polymerizable resin adhesive as described above, the solvent contained in the adhesive mixture is converted to a solid material during the polymerization of the resin. As a result, the problem of dimensional instability due to the removal of the solvent in the adhesive is completely eliminated.

According to one embodiment of the invention, a release agent such as a polyethylene wax, which does not require the application of water or other solvent is used for the release of the backing member. According to another embodiment, a backing member comprises a sheet of a tetrafluoroethylene plastic which does not require a layer of a release agent interposed between the backing member and the printed indicia.

The foregoing objects and other advantages will be described in greater detail by reference to the accompanying drawing of which:

Figure 1 is a series of sectional, elevational views illustrating the preparation of the printed indicia upon a backing member and the transfer of the printed indicia from the backing member to a substrate, according to the invention, Figure 2 is a partially-sectioned, elevational view of a tricolor kinescope including a luminescent screen prepared by the method of the invention, Figure 3 is a fragmentary elevational view of the dot screen of the kinescope of Figure 2, and Figure 4 is an elevational view of a line screen, prepared according to the invention.

Similar reference characters are applied to similar elements throughout the drawings.

Preparation of decalcomania transfer

*Example 1.*—Referring to Figures 1(a) and 1(b), a sheet of paper 21 about .005" thick and having good dimensional stability is provided with a coating 23 of a release agent, such as dextrin or other water soluble gum about .0001 to .002" thick and preferably about .0005" thick. It is preferred to use a gum-coated paper marketed under the name of No. 52 Warecal by the McLaurin-Jones Company, Brookfield, Massachusetts.

A phosphor paste is prepared comprising 50% of a blue-emitting phosphor, such as zinc sulphide with silver activator, 5% nitrocellulose and 45% isoamyl alcohol. Referring to Figure 1(c), the phosphor paste is then deposited as a first set of dots, B, about .014" in diameter and about .042" from center to center, upon the coated surface of the backing member 21. Each phosphor dot contains about 2.5 mg. of phosphor/cm.$^2$ of screen area. It is preferred to use a conventional silk screening process to deposit the phosphor dots, although other printing processes may be used.

When the first set of phosphor dots is dry, the second and then the third set of phosphor dots of the same size and spacing are deposited by the same method as the first set of dots. Each set of dots comprises a phosphor having a different emission color. The second set of phosphor dots, G, may comprise a green-emitting phosphor such as zinc silicate with manganese activator. The third set of phosphor dots, R, may comprise a red-emitting phosphor such as zinc selenide with copper activator. The second and third sets of phosphor dots are positioned upon the backing member with respect to the first set of dots so that triangular groups of three dots, all tangent to one another comprise one of each of the three different phosphors. The dots 25 of Figure 3 illustrate this arrangement.

*Example 2.*—A decalcomania transfer is prepared by coating a plastic sheet, such as a vinyl resin film marketed by E.I. du Pont de Nemours and Company, Wilmington, Delaware, having good dimensional stability and being about .005 to .100" thick, preferably .030" thick, with a polyethylene wax release agent. The release agent is preferably .0005" thick, but may be .0001 to .004" thick. A preferred release agent is AC Polyethylene Wax marketed by the Semit-Solvay Division, Allied Chemical and Dye Corporation, New York, New York. The phosphor dots of the luminescent screen are then printed in a manner similar to Example 1.

The backing member 21 for the decalcomania transfer may be any material exhibiting good dimensional stability and sufficient absorbency and rigidity to suit the printing process used. It is preferred that the backing member be sheet material about .002" to .100" thick. Paper (Example 1), resin-impregnated paper, and plastic or resin sheets (Example 2) may be used as the backing member. It has been found that a tetrafluoroethylene plastic, such as teflon, marketed by E. I. du Pont de Nemours and Company, Wilmington, Delaware, has many properties that are desirable for this purpose.

The release agent 23 is preferably as thin a layer as possible. A water soluble gum may be used, as in Example 1, provided it does not distort itself or other members of the transfer. If a water-soluble gum release agent is used, water must be applied to remove the backing member in a subsequent step of the process. In addition to water-soluble gums, a wax layer, preferably a polyethylene wax may be used as in Example 2. If a wax release agent is used, it is unnecessary to use water to release the backing member in the last step of the process. The backing member is merely peeled off. Where a tetrafluoroethylene plastic sheet is used, a release agent is unnecessary. In this case the surface of the teflon sheet has waxy characteristics and the sheet may be peeled away in the same manner as if a wax layer had been used.

The printing pastes of the examples may be any convenient silk screening paste adjusted to the particular process. It has been found that silk screening paste may comprise 25 to 75% of a powdered phosphor, 2 to 15% of nitrocellulose and 30 to 60% isoamyl alcohol. The preferred proportions are described in Example 1. Other binders besides nitrocellulose may be used, for example: ethyl cellulose, cellulose acetate, methyl cellulose, isobutyl methacrylate and polyvinyl acetate.

The phosphor may comprise any powdered phosphor. Examples of suitable phosphors are: blue-emitting: zinc sulphide with silver activator and calcium magnesium silicate with titanium activator; green-emitting: zinc silicate with manganese activator and zinc sulphide with copper activator; and red-emitting: zinc selenide with copper activator, zinc beryllium silicate with manganese activator and zinc phosphate with manganese activator.

The phosphor dots 25 are preferably deposited by a silk screen process. However, other printing processes such as letterpress, dry offset, or lithographic printing may be used. Where other printing processes are used, the printing inks are adjusted accordingly.

The printed phosphor dots 25 are preferably about .014" in diameter and contain 1.5 to 4 mg. of phosphor/cm.$^2$. It is preferred that they contain 2.5 mg./cm.$^2$. The phosphor dots are arranged such that they are tangent to one another and arranged in triangular groups of three, or trios. Each trio represents one of each of three different phosphors. The same printing plate may be used to print each different set of dots. However, the plate must be offset with respect to the backing member each time a set of dots is printed so that the dots will be tangent to one another rather than one set on top of another.

It may sometimes be desirable to overcoat the printed indicia with an adhesive or other material. However, the overcoating should not disturb or distort the printed material below.

Transfer of the printed indicia

*Example 3.*—The printed indicia 25 of Example 1 is now transferred to a substrate 31 which comprises a glass plate. A liquid adhesive is prepared comprising a polyester resin that is polymerizable to a solid. A preferred mix comprises 97% Marco 28C polyester resin marketed by the Marco Chemicals Inc., Linden, New Jersey. Marco 28C polyester resin comprises ⅔ polyester resin and ⅓ styrene; 2% benzoyl peroxide paste as a catalyst and 1% of a 50% dimethyl aniline solution in styrene, as an accelerator. This liquid mixture will polymerize to a solid without the addition of heat upon standing.

Referring to Figures 1(d) and 1(e), the liquid adhesive mix is then applied in the thin film, 33, about .001" thick upon the substrate 31 to which the printed indicia 25 is to be transferred. Referring to Figure 1(f), while the adhesive film 33 is still liquid the backing member 23 is positioned upon the film with indicia 25 imbedded in the film. The backing member 23 is pressed, rolled or squeegeed so as to remove air bubbles and to imbed the printed indicia 25 as close as possible to the substrate 31. The printed indicia 25 comprising the luminescent screen of the kinescope is preferably pressed down to the surface of the substrate 31. The adhesive film 33 is then allowed to polymerize to a solid. It generally requires about 30 minutes for the film 33 to polymerize at room temperature. Changes in catalyst and accelerator concentrations may be used to change the rate of polymerization from 1 minute to 2 hours.

Referring to Figure 1(g), after the resin film 33 has solidified the backing member 21 is wetted with water. The water penetrates the paper and softens the gum release agent. The paper is then stripped from the assembly. Any gum remaining on the printed indicia 25 is washed off with water.

*Example 4.*—After the printed indicia of Example 2 has dried, it may be transferred as in Example 3 except that the backing member 23 is stripped from the assembly by peeling off the backing member. This eliminates the step of wetting the paper to soften the water soluble gum of Examples 1 and 3. The use of a polyethylene wax permits the easy release of the backing member 25 with a minimum of distortion of the printed indicia that is transferred and also permits the use of a backing member that is not water-permeable.

The liquid adhesive of film 33 used in the process of the invention may be any liquid adhesive which will polymerize to a solid without the evaporation of the solvent. A polyester resin may be used such as the resin of Example 3, or Selectron 5081 marketed by the Pittsburgh Plate Glass Co., Pittsburgh, Pennsylvania, when used in conjunction with a suitable catalyst, promoter and accelerator marketed therefor. An ethoxyline resin mix may also be used. Examples of suitable ethoxyline resins are Araldite Types 101, 102, and CN503 marketed by the Ciba Company Inc., New York, New York.

One may also use a liquid comprising a resin which polymerizes to a solid upon the application of heat. However, it is preferred to use a liquid comprising a resin which polymerizes to a solid without the application of heat.

In the process of the invention, the system is preferably designed so that the solvent in the silk screen paste or other printing ink should not affect the gum release agent or the backing member. Similarly, the solvent of the liquid adhesive should not affect either the release agent or the printed indicia. Likewise, where a gum release agent is used, the solvent for the gum should not affect either the printed indicia or the polymerized adhesive film. The systems described in the examples satisfy these requirements.

Referring now to Figure 1(h), the assembly of Examples 3 or 4 is baked at about 425° C. for about one hour to burn off or depolymerize and volatilize the solidified adhesive film 33 and the nitrocellulose binder in the printed indicia 25. Upon baking, the printed indicia 25 remains upon the glass substrate 31, free of the adhesive film and free of the binder. The transferred luminescent screen exhibits a minimum amount of distortion and the phosphor dots 25 retain their original printed form with sufficient adherence to the glass substrate 31 to accomplish the further processing steps in the preparation of a tricolor kinescope. The subsequent processing steps may be the standard processing steps of silicate spraying, filming, aluminizing, second baking and so forth.

Referring now to Figures 2 and 3, the luminescent screen, comprising an array of triangular groups of dots 25 or trios, upon a glass substrate 31, may be incorporated into a tricolor kinescope. Structurally, the kinescope 51 may comprise three electron guns 53 mounted with their axes parallel to the central axis of the kinescope envelope 51, and spaced 120° with respect to each other. Each gun has a focus electrode, whose potential is adjusted to cause the electron beams to focus upon the phosphor dot luminescent screen. All three electron beams pass through an electro-optical system, whose potential is adjusted to cause the three beams to converge in the plane of an aperture mask 57. The three converging beams are deflected in the usual way, horizontally and vertically by a common yoke 59. The three electron beams can be made to converge on a single aperture of the aperture mask 57. By the angle of entry into a single aperture of the mask 57, each electron beam excites a different phosphor dot of a trio at the same time.

Referring to Figure 4, the luminescent screens of the invention may also comprise a series of strips of phosphors r, g, b of different colors of emission. In general, the luminescent screens may comprise a plurality of luminescent areas of one or more phosphors of different colors of emission and in any desired geometric arrangement.

While the invention has been described for the transfer of printed indicia to plane surfaces, the invention may also be carried out on a curved surface such as a cylindrical surface.

While the process has been described with respect to producing luminescent screens for tricolor kinescopes, it will be appreciated that the process of the invention may be used wherever a decalcomania transfer process is used wherein a high degree of dimensional fidelity with respect to the original printing plate is desired. There has been described improved methods and means for transferring printed indicia. There has also been described improved luminescent screens and kinescopes comprising luminescent screens, which are produced by a decalcomania process having improved dimensional fidelity.

What is claimed is:

1. A process for preparing a luminescent screen comprising printing luminescent indicia upon a backing member having good dimensional stability, attaching said indicia on said backing member to the surface of a substrate with a thin film of a liquid adhesive mixture comprising a resin that is polymerizable to a solid, polymerizing said resin film and then removing said backing member from said printed indicia.

2. A process for preparing a luminescent screen comprising preparing a composite transfer sheet including the step of printing luminescent indicia upon a backing member having good dimensional stability and then transferring the indicia to the surface of a substrate including the steps of applying to said substrate a thin film of a liquid mixture comprising a resin that is polymerizable to a solid, positioning said backing member on said film with said indicia imbedded therein, polymerizing said resin film, and removing said backing member from said indicia.

3. A process for preparing a luminescent screen comprising preparing a composite transfer sheet including the steps of printing luminescent indicia upon a backing member having good dimensional stability, and then transferring the printed indicia to the surface of a substrate including the steps of applying to the surface of said substrate a thin film of a liquid mixture comprising a polyester resin that is polymerizable to a solid, positioning said backing member on said film with said printed indicia imbedded therein, polymerizing said resin film, removing said backing member from said indicia and then removing said film.

4. A process for preparing a luminescent screen comprising preparing a composite transfer sheet including the steps of printing luminescent indicia upon a backing member having good dimensional stability, and then transferring the printed indicia to the surface of a substrate including the steps of applying to the surface of said substrate a thin film of a liquid mixture comprising an ethoxyline resin that is polymerizable to a solid, positioning said backing member on said film with said printed indicia imbedded therein, polymerizing said resin film, removing said backing member from said indicia and then removing said film.

5. A process for preparing a luminescent screen comprising preparing a composite transfer sheet including the steps of printing luminescent indicia upon a backing member having good dimensional stability and having a layer of a release agent upon the surface thereof, said indicia comprising a plurality of phosphor areas having about 1.5 to 4.0 mg. of phosphor per square cm. of area; and then transferring the indicia carried on said backing member including the steps of applying to the surface of a substrate a thin film about .0002 to .003 inch thick of a liquid mixture comprising a polyester resin that is polymerizable to a solid, positioning said backing member on said film with said printed indicia imbedded therein, polymerizing said resin film, removing said backing member from said indicia, and then baking said assembly to volatilize said polymerized resin film.

6. A process for preparing a luminescent screen comprising preparing a composite transfer sheet including the steps of printing luminescent indicia upon a backing member having good dimensional stability comprising a sheet of a tetrafluoroethylene plastic, applying to the surface of a substrate a thin film of a liquid mixture comprising a resin that is polymerizable to a solid, positioning said backing member on said film with said indicia imbedded therein, polymerizing said resin film and removing said backing member from said indicia.

7. A method of preparing a luminescent screen comprising preparing a composite transfer sheet including the steps of printing luminescent indicia upon a backing member having good dimensional stability and having a layer of a water soluble gum as a release agent upon the surface thereof, said backing member comprising a resin-impregnated paper and said indicia comprising a plurality of circular phosphor areas about .014 inch in diameter containing about 2.5 mg. of phosphor per square cm. of area, and then transferring the printed indicia carried on said backing member including the steps of applying to the surface of a substrate a thin film about .001 inch thick of a liquid mixture comprising a polyester resin that is polymerizable to a solid, positioning said backing member on said film with said indicia imbedded in said film, polymerizing said resin film, removing said backing member from said indicia and baking said assembly to volatilize said polymerized resin film.

8. A method of preparing a luminescent screen comprising preparing a composite transfer sheet including the steps of printing luminescent indicia upon a backing member having good dimensional stability and having a layer of a polyethylene wax as a release agent upon the surface thereof, said backing member comprising a resin-impregnated paper and said indicia comprising a plurality of circular phosphor areas about .014 inch in diameter containing about 2.5 mg. of phosphor per square cm. of area, and then transferring the printed indicia carried on said backing member including the steps of applying to the surface of a substrate a thin film about .001 inch thick of a liquid mixture comprising a polyester resin that is polymerizable to a solid, positioning said backing member on said film with said indicia imbedded in said film, polymerizing said resin film, removing said backing member from said indicia and baking said assembly to volatilize said resin film.

9. A method of transferring printed indicia carried on a backing member to the surface of a substrate comprising applying to the surface of the substrate a thin film of a liquid mixture comprising a resin that is polymerizable to a solid, positioning said backing member on said film with said indicia imbedded therein, polymerizing said resin film and then removing said backing member from said indicia.

10. A method of transferring printed indicia carried on a backing member to the surface of a substrate comprising applying to the surface of the substrate a thin film of a liquid mixture comprising a polyester resin that is polymerizable to a solid, positioning said backing member on said film with said indicia imbedded in said film, polymerizing said resin film, and then removing said backing member from said indicia.

11. A method of transferring printed indicia carried on a backing member to the surface of a substrate comprising applying to the surface of the substrate a thin film of a liquid mixture comprising an ethoxyline resin that is polymerizable to a solid, positioning said backing member on said film with said indicia imbedded in said film, polymerizing said resin film, and then removing said backing member from said indicia.

12. A method of transferring printed indicia carried on a backing member to the surface of a substrate comprising applying to the surface of the substrate a thin film of a liquid mixture comprising a polyester resin that is polymerizable to a solid, positioning said backing member on said film with said indicia imbedded in said film, polymerizing said resin film, and then removing said backing member from said indicia and then baking said assembly to volatilize said resin film.

References Cited in the file of this patent

UNITED STATES PATENTS

| | | |
|---|---|---|
| 2,426,462 | Marksberry | Aug. 26, 1947 |
| 2,476,570 | Van Horn et al. | July 19, 1949 |
| 2,615,807 | Umberger | Oct. 28, 1952 |
| 2,681,293 | Bayford et al. | June 15, 1954 |
| 2,716,081 | Marks | Aug. 23, 1955 |
| 2,716,082 | Smith | Aug. 23, 1955 |
| 2,734,013 | Myers | Feb. 7, 1956 |
| 2,757,112 | Hoyt | July 31, 1956 |